United States Patent [19]
Kristen

[11] Patent Number: 6,058,998
[45] Date of Patent: May 9, 2000

[54] PLASTIC BAG SEALING APPARATUS WITH AN ULTRACAPACITOR DISCHARGING POWER CIRCUIT

[75] Inventor: Hanns J. Kristen, San Anselmo, Calif.

[73] Assignee: Tilia International, Inc., Kowloon, The Hong Kong Special Administrative Region of the People's Republic of China

[21] Appl. No.: 09/022,613

[22] Filed: Feb. 12, 1998

[51] Int. Cl.⁷ ...................................................... B32B 31/20
[52] U.S. Cl. .................. 156/359; 156/583.2; 156/583.1; 156/580.1
[58] Field of Search ................................ 156/359, 583.2, 156/580.1, 580.2, 583.9, 583.1; 219/482, 483, 484, 485, 486, 487

[56] References Cited

U.S. PATENT DOCUMENTS

| | | | |
|---|---|---|---|
| 3,599,017 | 8/1971 | Oakes | 307/252 J |
| 3,867,226 | 2/1975 | Guido et al. | 156/229 |
| 4,329,568 | 5/1982 | Rocher et al. | 219/497 |
| 4,378,266 | 3/1983 | Gerken | 156/359 |
| 4,479,844 | 10/1984 | Yamada | 156/583.2 |
| 4,713,131 | 12/1987 | Obeda | 156/73.1 |
| 5,061,331 | 10/1991 | Gute | 156/64 |

FOREIGN PATENT DOCUMENTS

| | | | |
|---|---|---|---|
| 873.847 | 7/1942 | France | 219/20 |

OTHER PUBLICATIONS

Horowitz, Paul and Hill, Winfield. The Art of Electronics. New York. Cambridge University Press. 1989. pp. 44–46 and 590–599.

Irwin, J. David. Basic Engineering Circuit Analysis. New Jersey. Prentice Hall, Inc. 1996. pp. 290–319.

*Primary Examiner*—Richard Crispino
*Assistant Examiner*—George Koch
*Attorney, Agent, or Firm*—Fliesler, Dubb, Meyer & Lovejoy LLP

[57] ABSTRACT

An energy discharge circuit includes a high-power ultracapacitor 4 for providing pulses of electrical energy to a sealer 8 in an apparatus for sealing a plastic bag 38. The ultracapacitor 4 is charged by a power supply 30 and discharges the stored energy to the sealer 8, thereby enabling the sealing apparatus to seal the plastic bag 38 without the need for a high energy continuous electrical power source.

37 Claims, 2 Drawing Sheets

PLASTIC BAG SEALING APPARATUS WITH AN ULTRACAPACITOR DISCHARGING POWER CIRCUIT

BACKGROUND OF THE INVENTION

1. Field of the Invention

The present invention relates to a plastic bag sealing apparatus, and more particularly, to a plastic bag sealing apparatus with an ultracapacitor power supply circuit.

2. Background

Various types of electrical power supply circuits have been developed and used for supplying electrical power to plastic bag sealers. Conventional power supply circuits for plastic bag sealers include those adapted to receive electrical power from alternating current (AC) power sources and those adapted to receive power from direct current (DC) power sources. Some of these conventional circuits include conventional rectifier circuits adapted to convert AC power into DC power. Some of the conventional rectifier circuits include a capacitor which serves as a low-pass filter to smoothen DC pulses converted from the AC waveform. These conventional capacitors in the conventional rectifier circuits generally have small capacitances, usually in the range of several microfarads. In general, the conventional capacitors in conventional power supply circuits serve only as low-pass filters to filter out high frequency jitters to smoothen the DC pulses, and have capacitances too small to serve as energy storage units for supplying electrical power. A conventional plastic bag sealer usually includes a heating element powered by continuous energy from a conventional power supply circuit. However, the conventional power supply circuit is generally bulky and energy inefficient.

Furthermore, a conventional plastic bag sealer requires a timer or a heat sensor to control the amount of heating generated by the heating element to seal the plastic bags because the power supply circuit itself does not control the amount of energy supplied to the heating element. Moreover, the size, weight and energy inefficiency of conventional power supplies make them unsuitable for implementation in a portable or battery-operated plastic bag sealer. In some countries the AC voltage may not be compatible with the power supply circuit in a conventional plastic bag sealer, and in some areas AC power may not be available. A portable or battery-operated bag sealer with a compact power supply circuit may be desirable for applications such as the preservation of perishable goods at locations in which AC power is not available or is supplied at a different standard AC voltage.

Therefore, there is a need for a plastic bag sealer with a power supply circuit that is sufficiently light and small for portable applications. There is a further need for a plastic bag sealer with a high efficiency of energy conversion for use with low voltage power supplies such as batteries. There is yet a further need for a plastic bag sealer with a power supply circuit that generates a fixed and predetermined energy for each sealing without the necessity for a timer or a heat sensor to control the amount of energy used for sealing each bag.

SUMMARY OF THE INVENTION

The present invention satisfies these and other needs. In view of the above problems, the present invention provides a plastic sealing apparatus with a power supply circuit that includes an ultracapacitor to store a large amount of electrical energy which is released to a sealer upon discharge. In accordance with the present invention, an apparatus for sealing together at least two plastic layers roughly comprises:

(a) an electrical energy discharging circuit including a power supply and an ultracapacitor coupled to the power supply, the ultracapacitor capable of being charged with an electrical energy from the power supply and generating an electrical discharge; and (b) a sealer coupled to receive the electrical energy from the electrical energy discharging circuit.

The power supply can be either an alternating current (AC) power supply or a direct current (DC) power supply. If the power supply is an AC power supply, the AC voltage can be downconverted and rectified by a diode to provide a rectified voltage to charge the ultracapacitor. The electrical energy discharging circuit may further include a switch connected between the power supply, the ultracapacitor and the sealer, the switch capable of moving between a first position, where the ultracapacitor is charged with the electrical energy from the power supply, and a second position where the electrical energy stored in the ultracapacitor is discharged to the sealer. The energy discharging circuit may further include a second diode, for example, a light emitting diode (LED), which is capable of emitting a visible light to indicate that power is being supplied to the sealer.

Advantageously, the apparatus according to the present invention can be of a small size and light weight for portable applications. A further advantage of the invention is that the apparatus includes an ultracapacitor circuit which can be used with a low voltage DC power supply such as a battery to provide the power needed for sealing plastic bags. Yet another advantage of the invention is that it obviates the need for a timer or a heat sensor to control the amount of energy needed for sealing each plastic bag.

BRIEF DESCRIPTION OF THE DRAWINGS

The invention will be described with respect to particular embodiments thereof, and references will be made to the drawings in which.

DETAILED DESCRIPTION

Figure 1:
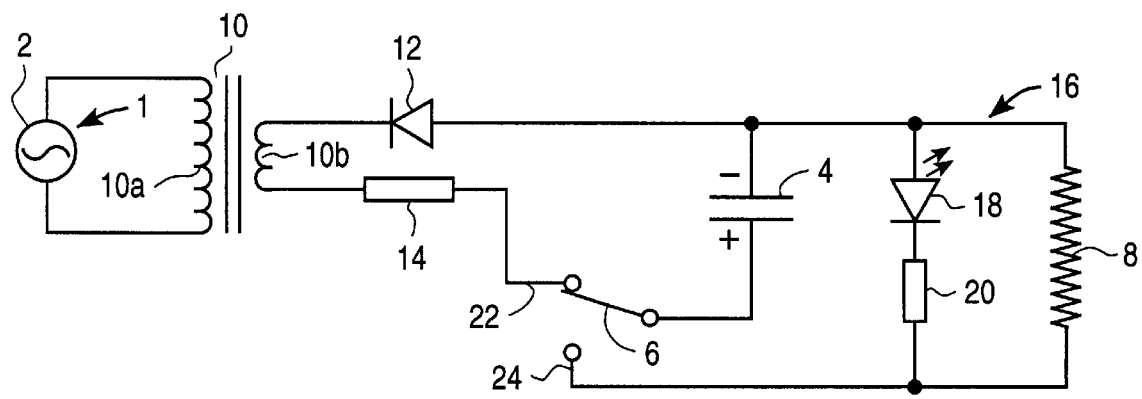
FIG. 1 is a circuit diagram of the apparatus according to the present invention with an alternating current (AC) power supply.

FIG. 1 shows a circuit diagram of an embodiment of the apparatus for sealing plastic bags according to the present invention, with a power supply input 1 connected to an alternating current (AC) power supply 2, an ultracapacitor 4, a switch 6, and a plastic bag sealer 8. If the AC power supply 2 carries a high voltage, for example, 115 volts or 230 volts from a power outlet, a voltage transformer 10 may be connected to the AC power supply 2 to downconvert the high AC voltage from the power supply 2 to a lower AC voltage. For example, the AC voltage may be reduced by a factor of N if the transformer has a winding ratio of N:1. The AC voltage needs to be rectified such that an electrical energy can be charged to the ultracapacitor 4 without changing the polarity of the voltage. To rectify the AC voltage, a rectifying diode 12 may be connected to the ultracapacitor 4 and coupled to the AC power supply 2 such that the polarity of the voltage across the ultracapacitor 4 is maintained by the forward biasing of the diode 12. In the illustrative embodiment shown in FIG. 1, the transformer 10 includes a primary 10a connected to the AC power supply 2 and a secondary 10b connected to the diode 12. A first resistor 14, which serves as a charge control resistor, may be optionally provided to control the rate of charging the ultracapacitor 4.

A discharge circuit 16 is coupled to receive an electrical discharge from the ultracapacitor 4. The discharge circuit 16 includes the sealer 8, an example of which is a conventional heat sealer for sealing plastic layers. The discharge circuit 16 may also include a second diode 18, for example, a light emitting diode (LED), for emitting a visible light to indicate that electrical energy is being discharged from the ultracapacitor 4 in the sealing process. The LED 18 can be connected in parallel with the sealer 8, and the discharge circuit 16 may further include a second resistor 20, which serves as an LED resistor, connected in series with the LED 18. The LED 18 merely serves to indicate to an operator the status of energy discharge to the plastic bag sealer 8, and is thus not critical to the present invention.

The switch 6 can be a two-position switch which is adapted to occupy a first position 22 where the ultracapacitor 4 is charged with the electrical energy from the power supply 2 when a closed circuit is formed between the ultracapacitor 4, the diode 12, the secondary 10b of the transformer 10, and the first resistor 14. When the switch 6 is in the first position 22, the ultracapacitor 4 is charged and a voltage across the ultracapacitor 4 is formed with a voltage polarity indicated in FIG. 1. The charging of the ultracapacitor 4 continues until the voltage across the ultracapacitor 4 is about the same as the peak voltage of the AC waveform at the secondary 10b of the transformer 10. The switch 6 can be switched from the first position 22 to the second position 24 such that a closed circuit is formed between the ultracapacitor 4 and the discharge circuit 16. At this time, a current flows from the ultracapacitor 4 to the sealer 8, thereby transferring the electrical energy stored in the ultracapacitor 4 to the sealer 8 for sealing plastic bags. In addition to sealing plastic bags, the apparatus according to the present invention can also be used for sealing other layers such as polymer layers, rubber layers, or specially coated papers or films.

In the illustrative example shown in FIG. 1, the LED 18 is reverse biased with respect to the voltage across the ultracapacitor 4, and therefore only a negligibly small current flows through the serially connected LED 18 and the LED resistor 20. After the electrical energy stored in the ultracapacitor 4 is discharged to the sealer 8, the switch 6 can be switched back to the first position 22 to recharge the ultracapacitor 4. The switch 6 may be switched between the first and second positions 22 and 24 in multiple repetitions to seal a plurality of plastic bags successively.

The switch 6 may be implemented in various configurations. For example, a simple conventional two-position mechanical switch can be used as the switch 6 if the plastic bag sealing apparatus is intended for home or personal applications in which sealing a plurality of plastic bags in a quick succession is not required. For a plastic bag sealing apparatus which is designed to seal a plurality of plastic bags within a short period of time, the switch 6 can be implemented as a conventional automatic reset-to-charge switch such that the switch 6 engages the first position 22 for charging the ultracapacitor 4 over a fixed time interval and the second position 24 for energizing the sealer 8 over another fixed time interval.

In some applications in which the plastic bag sealing apparatus is required to seal various types of plastic bags or plastic bags with various thicknesses, variable sealing times may be required. In these applications, the switch 6 may be implemented as a conventional adjustable reset switch that allows an operator to set variable time intervals for the switch 6 to engage the first position 22 for charging the ultracapacitor 4 and the second position 24 for discharging the energy stored in the ultracapacitor 4 to the sealer 8. The two-position mechanical switch, the automatic reset switch, and the adjustable reset switch are conventional and well known to a person skilled in the art. However, the present invention is not limited to these types of switches; other types of switches can also be used as the switch 6.

The ultracapacitor 4, which stores the electrical energy necessary for the sealer 8 to seal plastic bags, should have a sufficiently large capacitance, for example, in the range of about 1 F to about 10 F, to be able to store the amount of energy required. This is in contrast to conventional capacitors used for smoothing DC currents in conventional rectifying power supply circuits, which usually have capacitances ranging from several picofarads to several microfarads. The conventional capacitors in such power supply circuits are not nearly sufficient to provide the electrical energy needed to seal a plastic bag. Examples of the ultracapacitor 6 include one made of sandwiches of plastic and electrolyte-soaked carbon. Alternatively, the ultracapacitor 6 may be made of ceramics. It is understood that the present invention is not limited to these types of ultracapacitors. Other types of capacitors that provide a large capacitance to store sufficient electrical energy for discharge to the plastic bag sealer 8 can also be used as the ultracapacitor 4 in the circuit according to the present invention.

Figure 2:
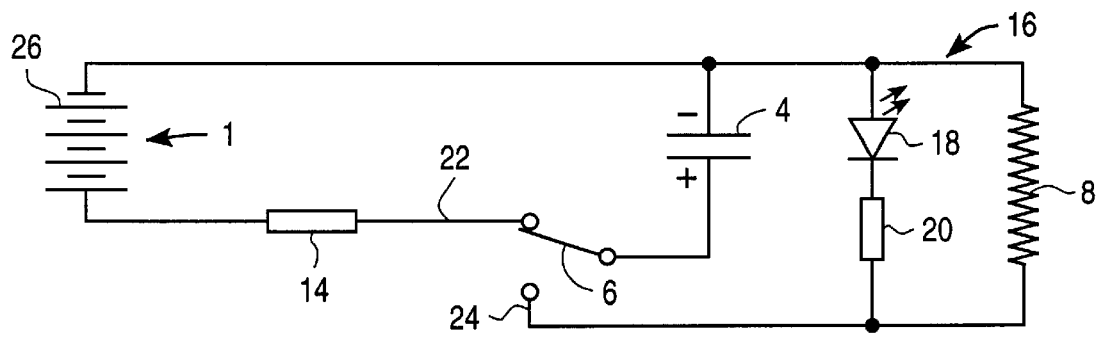
FIG. 2 is a circuit diagram of the apparatus according to the present invention with a direct current (DC) power supply.

FIG. 2 shows a circuit diagram of another embodiment of the present invention with the power supply input 1 connected to a direct current (DC) power supply 26 instead of the AC power supply 2 of FIG. 1. The circuit of FIG. 2 is similar to that of FIG. 1 except that the transformer 10 and the rectifying diode 12 are not required for the DC power supply 26. The ultracapacitor 4, the switch 6, and the sealer 8 are connected in the same manner as in FIG. 1. The charge control resistor 14 may be optionally included to control the rate of charge by the DC power supply 26 to the ultracapacitor 4 when the switch 6 is in the first position 22 to form a closed circuit between the DC power supply 26, the charge control resistor 14, and the ultracapacitor 4. The switch 6 can be switched to the second position 24 to form a closed circuit between the ultracapacitor 4 and the sealer 8, thereby discharging the electrical energy stored in the ultracapacitor 4 to the sealer 8.

In a manner similar to that which is shown in FIG. 1 and described above, the discharge circuit 16 in FIG. 2 may optionally include an LED 18 connected in parallel with the sealer 8, and may further include an LED resistor 20 connected in series with the LED 18. The LED 18, which is reverse biased with respect to the voltage across the ultracapacitor 4, emits a visible light to indicate a discharge from the ultracapacitor 4 when the ultracapacitor 4 supplies the energy to the sealer 8. A low voltage battery or series of batteries can be used as the DC power supply 26. In the embodiment shown in FIG. 2, only a low DC voltage, for example, in the range of about 12 volts to about 24 volts, is needed to charge the ultracapacitor 4.

Figure 3:
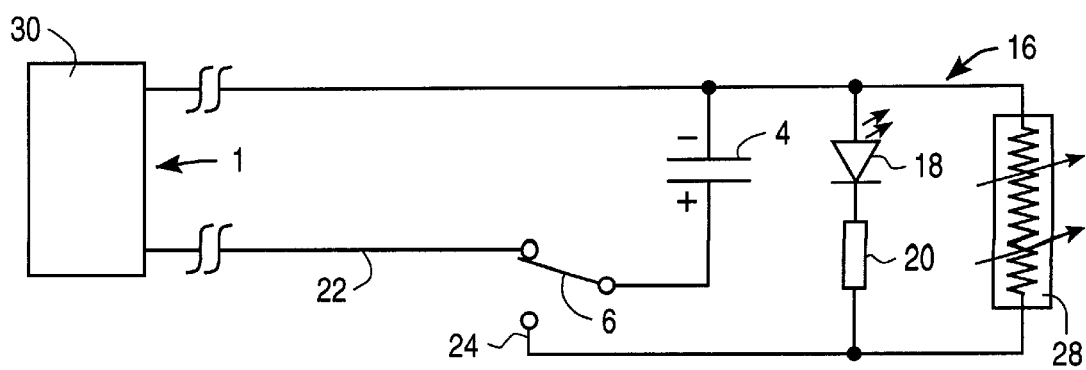
FIG. 3 is a circuit diagram of the apparatus according to the present invention with a heat pulse or ultrasonic generator for sealing plastic bags.

FIG. 3 shows a circuit diagram of another embodiment of the present invention similar to FIGS. 1 and 2 except that the heat sealer 8 is replaced with a heat pulse or ultrasonic generator 28. Heat pulse or ultrasonic generators can be used for heat sealing with pulses of high energy electricity, which can be readily provided by the ultracapacitor 4. The power supply for the circuit of FIG. 3 is indicated generically by block 30, which can be either the AC power supply 2 with the transformer 10 and rectifying diode 12 of FIG. 1 or the DC power supply 26 of FIG. 2 connected to the power supply input 1. The heat pulse or ultrasonic generator 28 is energy efficient and therefore may be desirable for portable applications.

Figure 4:
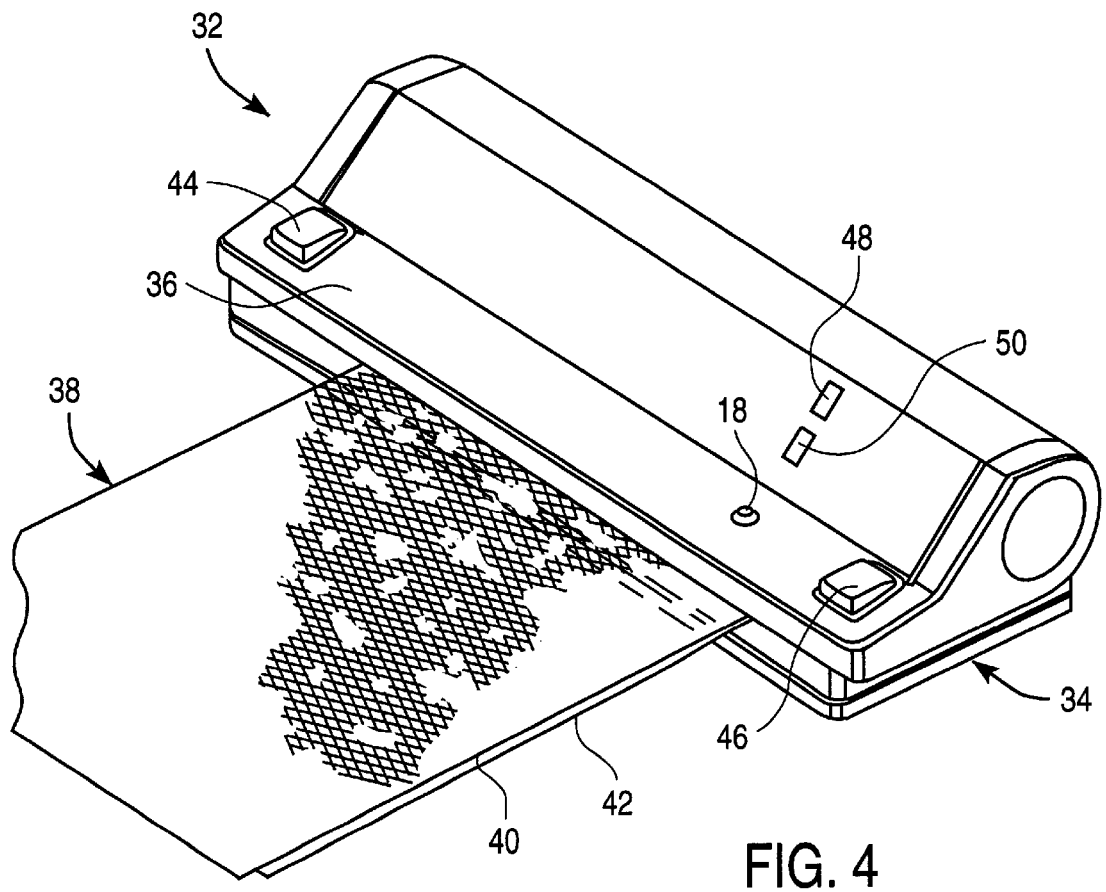
FIG. 4 is a perspective view of an embodiment of the apparatus according to the present invention.

FIG. 4 shows a perspective view of an embodiment of a plastic bag sealing apparatus 32 having a base 34 and a movable top portion or hood 36 engaging a plastic bag 38 with at least two plastic layers 40 and 42. Two release buttons 44 and 46 are provided on the hood 36 to disengage the hood 36 from the base 34, thereby releasing the plastic bag 38 from the sealing apparatus 32. The two-position switch 6 in FIGS. 1–3 can be implemented on the hood 36 as first and second touch buttons 48 and 50, respectively. For example, when the first touch button 48 is pressed, the switch 6 of FIGS. 1–3 moves into the first position 22 to charge the ultracapacitor 4, and when the second touch button 50 is pressed, the switch 6 moves into the second position 24 to discharge the energy stored in the ultracapacitor 4 to the plastic bag sealer 8. The diode 18 in FIGS. 1–3, which as indicated may be an LED, may be positioned on the hood 36 in FIG. 4 as an indicator light which indicates a discharge.

Figure 5:
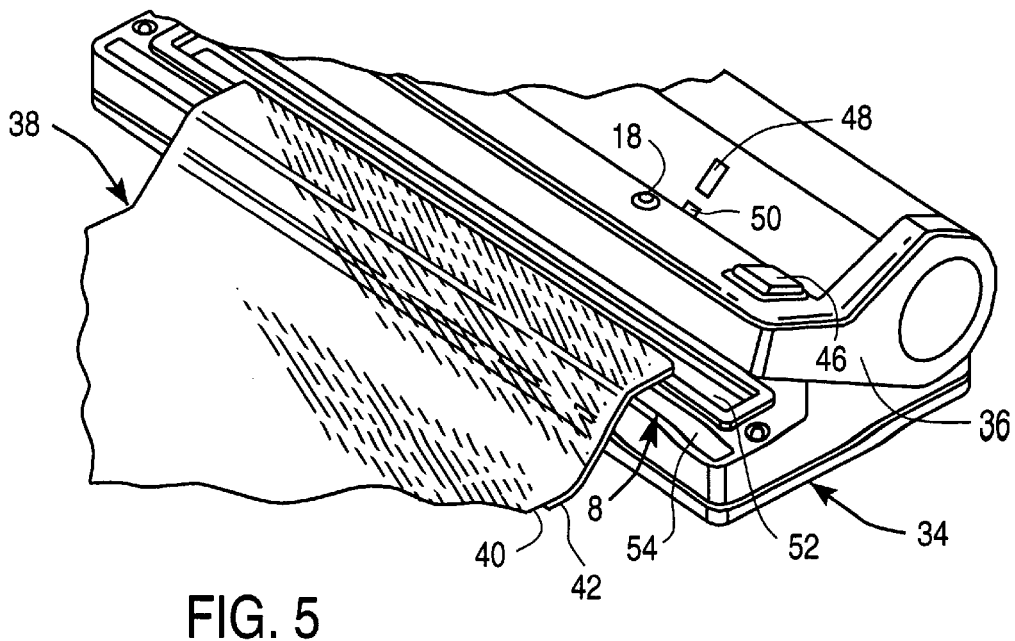
FIG. 5 is a partial perspective view of the apparatus of FIG. 4 with the hood in a partially opened position showing a heat sealer.

FIG. 5 shows a partial perspective view of the plastic bag sealing apparatus of FIG. 4 with the hood 36 in a partially disengaged position from the base 34, thereby exposing the heat sealer 8 and a trough 52 for securing the plastic layers 40 and 42 of the plastic bag 38 during the sealing process. In addition, a polytetrafluoroethylene tape 54 may be attached to the heat sealer 8 to prevent the plastic layer 42 from adhering to the heat sealer 8 when it is heated.

FIGS. 4–5 show only one illustrative embodiment in which the power supply circuits of FIGS. 1–3 with the ultracapacitor 4 can be implemented. However, the apparatus according to the present invention with an ultracapacitor as an energy storage and discharge element is not limited to those which are shown in FIGS. 1–5 and described above; other embodiments of the apparatus according to the present invention are also possible.

The invention has been described with respect to particular embodiments thereof, and numerous modifications can be made which are in the scope of the invention as set forth in the claims.

What is claimed is:

1. An apparatus for sealing at least two plastic layers, comprising:
    (a) a power supply input capable of being supplied with an electrical energy;
    (b) an ultracapacitor coupled to store the electrical energy received by the power supply input;
    (c) a discharge circuit coupled to the ultracapacitor to discharge the electrical energy stored in the ultracapacitor; and
    (d) a sealer coupled to receive the electrical energy from the discharge circuit, the sealer capable of sealing the at least two plastic layers together upon a single discharge of the ultracapacitor.

2. The apparatus of claim 1, further comprising a charge control resistor coupled between the ultracapacitor and the power supply input.

3. The apparatus of claim 1, wherein the power supply input is adapted to be coupled to a direct current (DC) power supply.

4. The apparatus of claim 1, wherein the power supply input is adapted to be coupled to an alternating current (AC) power supply.

5. The apparatus of claim 4, further comprising a first diode coupled between the power supply input and the ultracapacitor.

6. The apparatus of claim 4, further comprising a transformer coupled between the power supply input and the ultracapacitor.

7. The apparatus of claim 1, wherein the discharge circuit further includes a switch connected between the power supply input, the ultracapacitor and the sealer, the switch capable of occupying a first position to charge the ultracapacitor with the electrical energy from the power supply input and a second position to discharge the electrical energy stored in the ultracapacitor to the sealer.

8. The apparatus of claim 1, wherein the discharge circuit further includes a second diode connected in parallel with the sealer.

9. The apparatus of claim 8, wherein the second diode comprises a light emitting diode (LED).

10. The apparatus of claim 8, wherein the discharge circuit further includes a second resistor connected in series with the second diode.

11. The apparatus of claim 1, wherein the sealer comprises a heat sealer.

12. The apparatus of claim 1, wherein the sealer comprises a heat pulse generator.

13. The apparatus of claim 1, wherein the sealer comprises an ultrasonic generator.

14. An apparatus for sealing at least two plastic layers, comprising:
    (a) a power supply input capable of being supplied with an electrical energy;
    (b) an ultracapacitor coupled to store the electrical energy received by the power supply input;
    (c) a discharge circuit coupled to the ultracapacitor, the discharge circuit including a sealer for sealing the at least two plastic layers together; and
    (d) a switch connected between the power supply input, the ultracapacitor and the discharge circuit, the switch adapted to occupy a first position where the ultracapacitor is charged with the electrical energy from the power supply input, and a second position where the electrical energy stored in the ultracapacitor is discharged to the sealer, the switch moving between the first and second positions once for the sealer to seal the at least two plastic layers together.

15. The apparatus of claim 14, further comprising a charge control resistor coupled between the ultracapacitor and the power supply input.

16. The apparatus of claim 14, wherein the power supply input is adapted to be connected to a direct current (DC) power supply.

17. The apparatus of claim 14, wherein the power supply input is adapted to be connected to an alternating current (AC) power supply.

18. The apparatus of claim 17, further comprising a first diode coupled between the power supply input and the ultracapacitor.

19. The apparatus of claim 17, further comprising a transformer coupled between the power supply input and the ultracapacitor.

20. The apparatus of claim 14, wherein the discharge circuit further includes a second diode connected in parallel with the sealer.

21. The apparatus of claim 20, wherein the second diode comprises a light emitting diode (LED).

22. The apparatus of claim 20, wherein the discharge circuit further includes a second resistor connected in series with the second diode.

23. The apparatus of claim 14, wherein the sealer comprises a heat sealer.

24. The apparatus of claim 14, wherein the sealer comprises a heat pulse generator.

25. The apparatus of claim 14, wherein the sealer comprises an ultrasonic generator.

26. An apparatus for sealing at least two plastic layers, comprising:

(a) a power supply input adapted to receive an electrical energy;

(b) an ultracapacitor coupled to store the electrical energy received by the power supply input;

(c) a sealer coupled to the ultracapacitor for sealing the at least two plastic layers together; and (d) a switch connected between the power supply input, the ultracapacitor and the sealer, the switch adapted to occupy a first position to charge the ultracapacitor with the electrical energy from the power supply input and a second position to discharge the electrical energy stored in the ultracapacitor to the sealer, a single discharge of the energy stored in the ultracapacitor providing sufficient energy to the sealer to seal the at least two plastic layers together.

27. The apparatus of claim 26, further comprising a charge control resistor connected between the ultracapacitor and the power supply input.

28. The apparatus of claim 26, wherein the power supply input is adapted to be connected to a direct current (DC) power supply.

29. The apparatus of claim 26, wherein the power supply input is adapted to be connected to an alternating current (AC) power supply.

30. The apparatus of claim 29, further comprising a first diode coupled between the power supply input and the ultracapacitor.

31. The apparatus of claim 29, further comprising a transformer coupled between the power supply input and the ultracapacitor.

32. The apparatus of claim 26, further comprising a second diode connected in parallel with the sealer.

33. The apparatus of claim 32, wherein the second diode comprises a light emitting diode (LED).

34. The apparatus of claim 32, further comprising a second resistor connected in series with the second diode.

35. The apparatus of claim 26, wherein the sealer comprises a heat sealer.

36. The apparatus of claim 26, wherein the sealer comprises a heat pulse generator.

37. The apparatus of claim 26, wherein the sealer comprises an ultrasonic generator.

* * * * *